United States Patent [19]

Chang

[11] Patent Number: 5,479,836
[45] Date of Patent: Jan. 2, 1996

[54] QUICK RELEASE HAVING AN ANTI-THEFT DEVICE

[76] Inventor: Chin-Shu Chang, 58, Ma Yuan West St., Taichung, Taiwan

[21] Appl. No.: 276,661

[22] Filed: Jun. 20, 1994

Related U.S. Application Data

[63] Continuation-in-part of Ser. No. 156,163, Nov. 23, 1993, abandoned.

[51] Int. Cl.⁶ .......................... B62K 21/12; A45C 13/10; E05B 65/52
[52] U.S. Cl. .......................... 74/551.1; 70/201; 70/233; 70/261
[58] Field of Search .......................... 74/551.1–551.8; 280/279, 281.1; 70/223, 201, 261; 403/254

[56] References Cited

U.S. PATENT DOCUMENTS

| | | | |
|---|---|---|---|
| 3,807,761 | 4/1974 | Brilando et al. | 280/279 |
| 4,028,915 | 6/1977 | Stahl | 70/233 |
| 4,114,409 | 9/1978 | Scire | 70/233 |
| 4,191,036 | 3/1980 | Steinbach | 70/363 |
| 4,621,873 | 11/1986 | Weinstein et al. | 70/233 |
| 4,724,692 | 2/1988 | Turin et al. | 70/233 X |
| 4,951,487 | 8/1990 | Sheils Dennis | 70/233 |
| 4,964,287 | 10/1990 | Gaul | 70/233 |
| 5,005,390 | 4/1991 | Giannini et al. | 70/233 |
| 5,007,260 | 4/1991 | Sharp | 70/233 |
| 5,022,672 | 6/1991 | Kawai | 280/281.1 |
| 5,027,628 | 7/1991 | De Rocher et al. | 70/233 |
| 5,118,125 | 6/1992 | Plunkett | 280/279 |
| 5,172,601 | 12/1992 | Siegrist et al. | 403/254 |
| 5,279,137 | 1/1994 | Orbell | 280/279 X |
| 5,291,763 | 3/1994 | Cuisinot | 70/201 |
| 5,337,587 | 8/1994 | Davidson | 70/233 |
| 5,339,660 | 8/1994 | Fell | 70/233 |
| 5,380,061 | 1/1995 | Pendleton | 70/233 X |

FOREIGN PATENT DOCUMENTS

| | | | |
|---|---|---|---|
| 147845 | 7/1936 | Austria | 70/233 |
| 2485466 | 12/1981 | France | 280/279 |
| 5-65090 | 3/1993 | Japan | 280/279 |
| 68002 | 5/1951 | Netherlands | 70/233 |
| 203007 | 2/1939 | Switzerland | 74/551.3 |
| 582379 | 11/1946 | United Kingdom | 70/201 |
| 585592 | 2/1947 | United Kingdom | 70/233 |

*Primary Examiner*—Vinh T. Luong

[57] ABSTRACT

A quick release mechanism is engaged on a two wheeled cycle for securing wheels, seat post or other elements. The quick release mechanism includes a post engaged through a pad and a sleeve, and threadedly engaging with a nut. A lock housing is secured on one end of the post. A core is rotatably engaged in the lock housing. A handle includes two cams secured to two end portions of the core such that the core and the handle rotate in concert. The handle is prevented from rotating when the core is locked to the lock housing such that the quick release mechanism may not be disengaged from the bicycle frame.

1 Claim, 7 Drawing Sheets

5,479,836

QUICK RELEASE HAVING AN ANTI-THEFT DEVICE

CROSS REFERENCE TO RELATED APPLICATION

This is a continuation-in-part of application Ser. No. 08/156,163, filed Nov. 23, 1993, now abandoned.

BACKGROUND OF THE INVENTION

1. Field of the Invention

The present invention relates to a quick release mechanism, and more particularly to a quick release mechanism having an anti-theft device.

2. Description of the Prior Art

Typical quick release mechanisms are provided to coupled the wheels to the bicycle frame or to fix the seat post to the bicycle frame, as indicated by the arrows in FIG. 8, one type of the typical release mechanisms is shown in FIG. 9 and indicated by the reference numeral 1 and comprises a handle 11 having a hand grip 111 formed on one end and two cams 112 formed on the other end, a ring 131 fixed on the top of a post 13 and pivotally coupled between the cams 112, an outer thread 132 formed in the lower portion of the post 13 for engaging with a nut 14 for limiting the movement of one end of a sleeve A, and a pad 12 disposed on the upper portion of the post 13 and located below the the cams 112 and engaged with the cams 112, the pad 12 is caused to move the ends of the sleeve A toward or away from each other so as to form a quick release mechanism for a bicycle, however, the quick release mechanism has no anti-theft device.

The present invention has arisen to mitigate and/or obviate the afore-described disadvantages of the conventional quick release mechanisms.

SUMMARY OF THE INVENTION

The primary objective of the present invention is to provide a quick release mechanism which includes an anti-theft device for protecting the quick release mechanism.

In accordance with one aspect of the invention, there is provided a quick release mechanism comprising a post including a first end having an outer thread formed thereon and a second end having a lock housing provided thereon, a pad slidably engaged on the post, a nut threadedly engaged with the outer thread of the post, a core rotatably engaged in the lock housing and including two sides each having a rib formed thereon, a handle including two cams formed thereon, each of the cams including a groove formed therein for engaging with the ribs of the core such that the core and the handle rotate in concert, and means for locking the core to the lock housing so as to prevent the handle from rotating relative to the lock housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
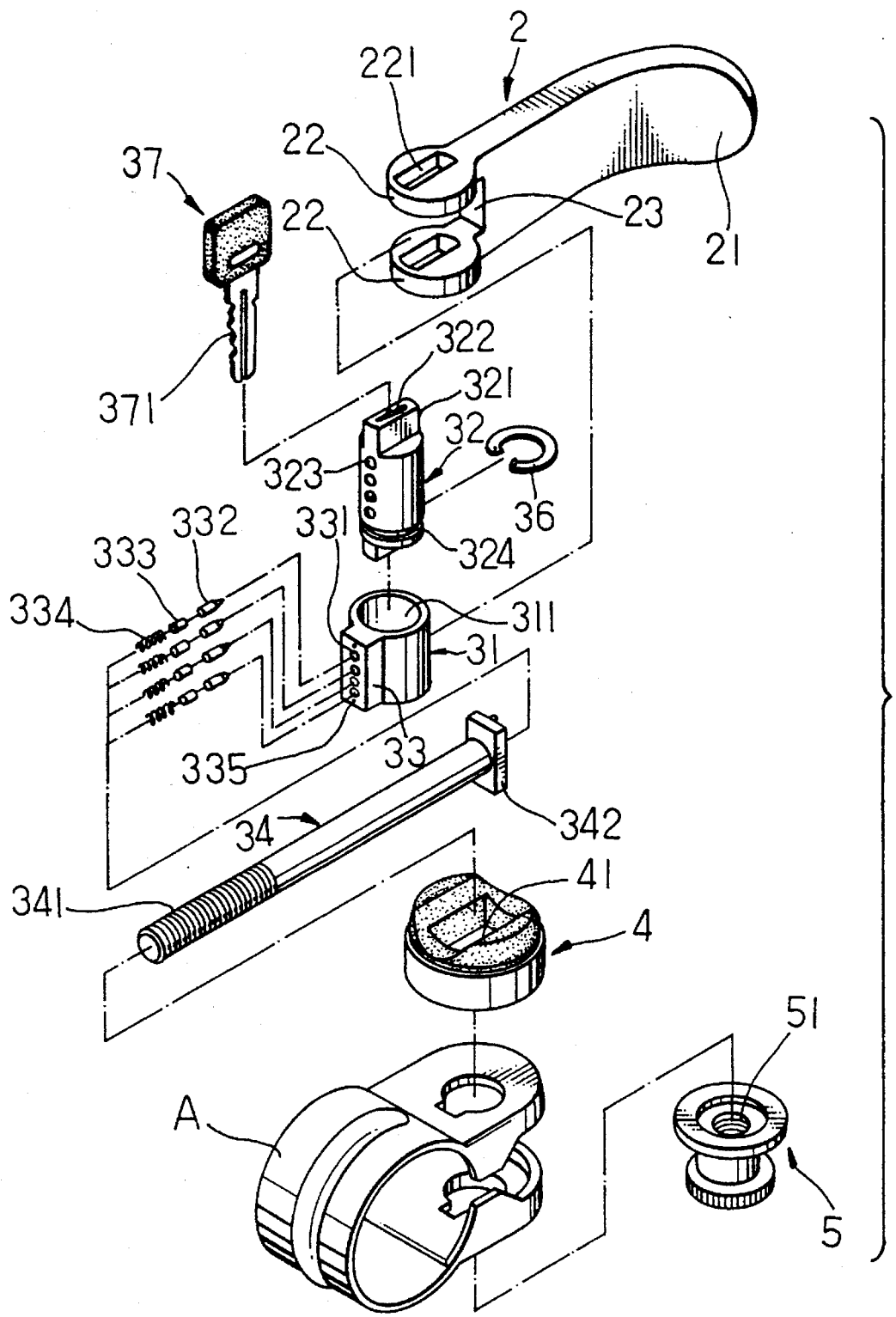
FIG. 1 is an exploded view of a quick release mechanism in accordance with the present invention.
Figure 2:
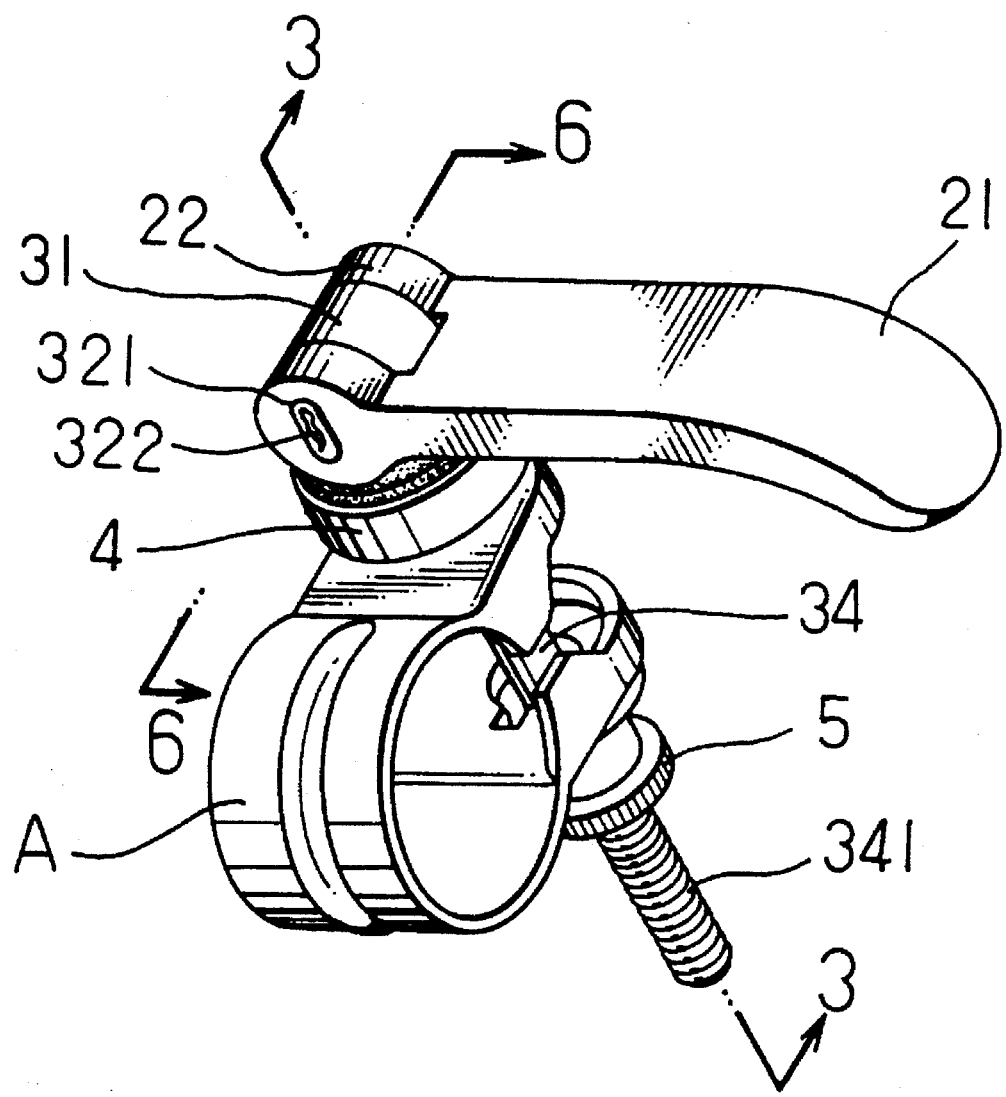
FIG. 2 is a perspective view of the quick release mechanism.
Figure 3:
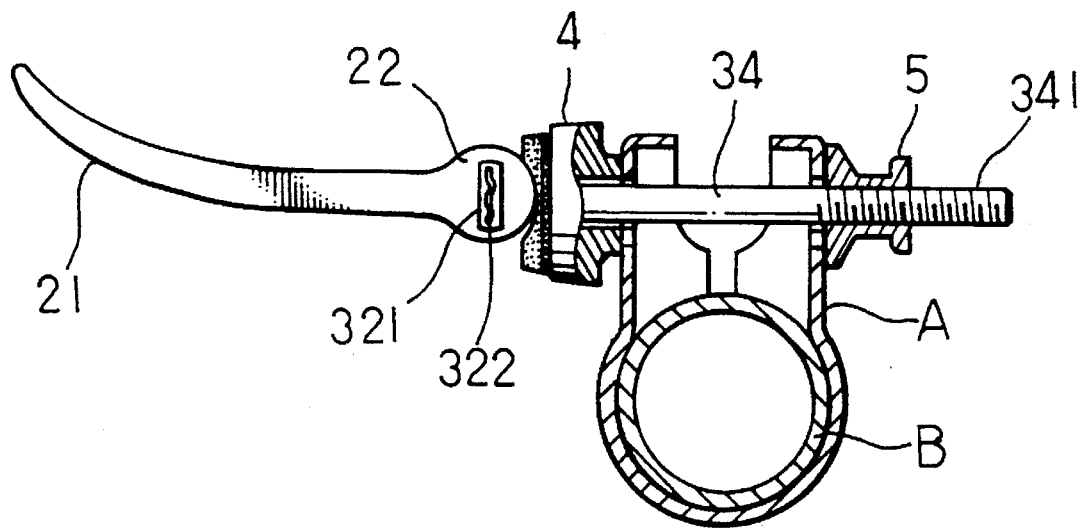
FIGS. 3 and 4 are cross sectional views of the quick release mechanism, taken along lines 3—3 of FIG. 2.

Referring to the drawings, and initially to FIGS. 1, 2 and 3, a quick release mechanism in accordance with the present invention comprises a sleeve A including two end portions movable toward each other. A handle 2 includes a hand grip 21 formed on one end and two cams 22 formed on the other end. The cams 22 each includes a groove 221 formed therein. A cavity 23 is formed between the cams 22. A locking device includes a lock housing 31 having a core 32 rotatable disposed in the hollow interior 311 of the lock housing 31. A block 33 is formed on the lock housing 31 and includes a number of apertures 331 formed therein for receiving stubs 332, 333 and springs 334, and includes two holes 335 formed therein. The core 32 includes two sides each having a rib 321 formed thereon for engaging with the grooves 221 of the cams 22 respectively such that the core 32 rotates in concert with the handle 21. A key hole 332 is formed in one of the ribs 321 for receiving a key 37 which includes a number of depressions 371 formed therein. The core 32 includes an annular groove 324 formed therein for engaging with a retaining ring 36 so as to secure the core 32 within the lock housing 31, best shown in FIGS. 6 and 7. The core 32 includes a number of holes 323 for engaging with stubs 332.

A post 34 includes a head 342 formed on one end and an outer thread 341 formed on the other end. Two projections 343 are extended from the head 342 for engaging with the holes 335 of the block 33. The head 342 is secured to the block 33 by such as welding processes. A pad 4 includes an opening 41 for engaging with the head 342 and the block 33. The post 34 is engaged through the opening 41 of the pad 4 and engaged through the end portions of the sleeve A. A nut 5 includes an inner thread 51 formed therein for engaging with the outer thread 341 of the post 34.

Figure 4:
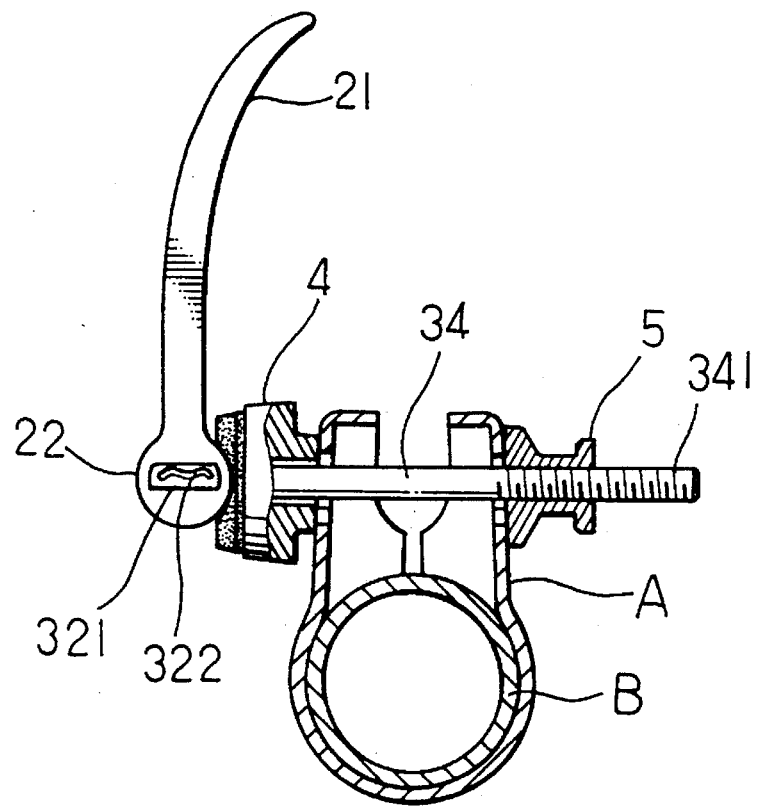
Figure 5:
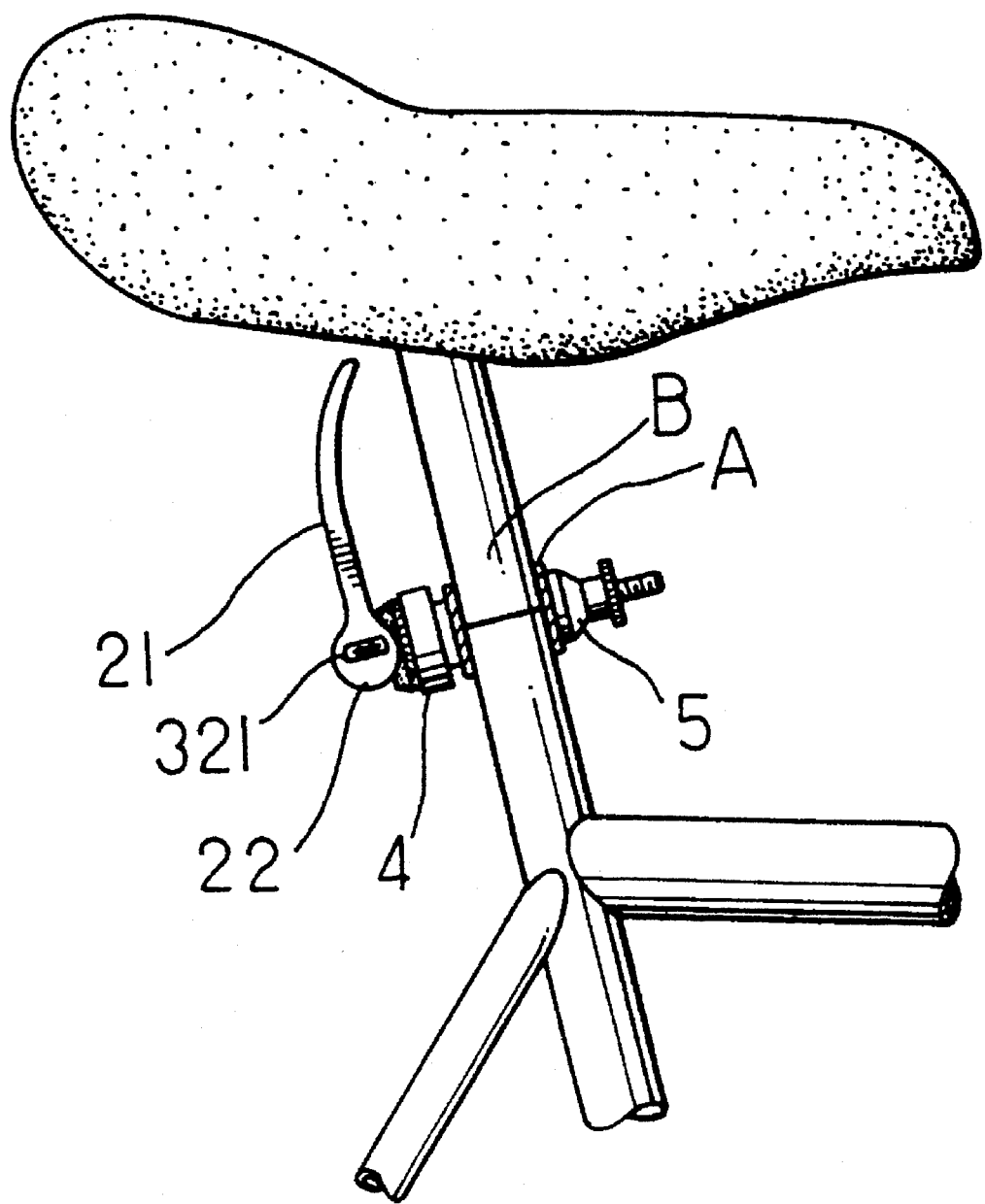
FIG. 5 is a schematic view illustrating the application of the quick release mechanism.

As shown in FIGS. 2 and 3, the end portions of the sleeve A are engaged on the post 34 and located between the pad 4 and the nut 5, the end portions of the sleeve A can be caused to move toward or away from each other when the pad 4 is moved by the cam portions 22 of the handle 2 and when the handle 2 is rotated, best shown in FIGS. 3 and 4. Whereby, the sleeve A can be fixed on the bicycle frame B. As shown in FIG. 5, the quick release mechanism can be used to fix the seat post.

Figure 6:
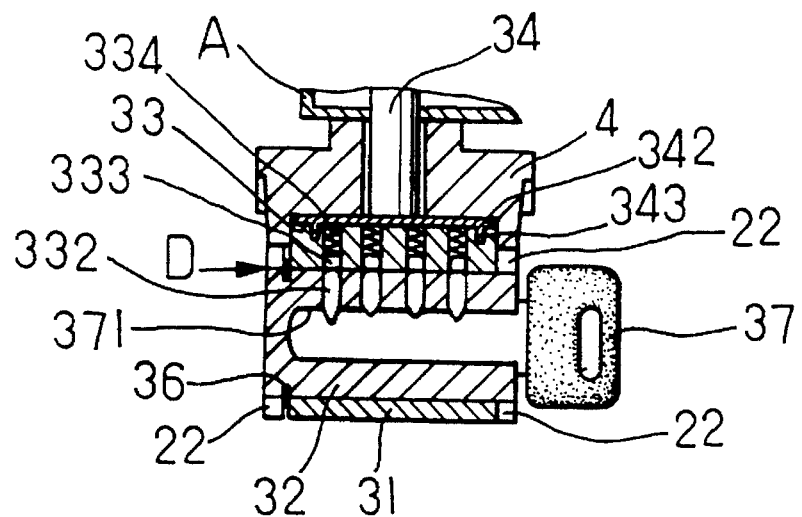
FIGS. 6 and 7 are cross sectional views taken along lines 6—6 of FIG. 2.
Figure 7:
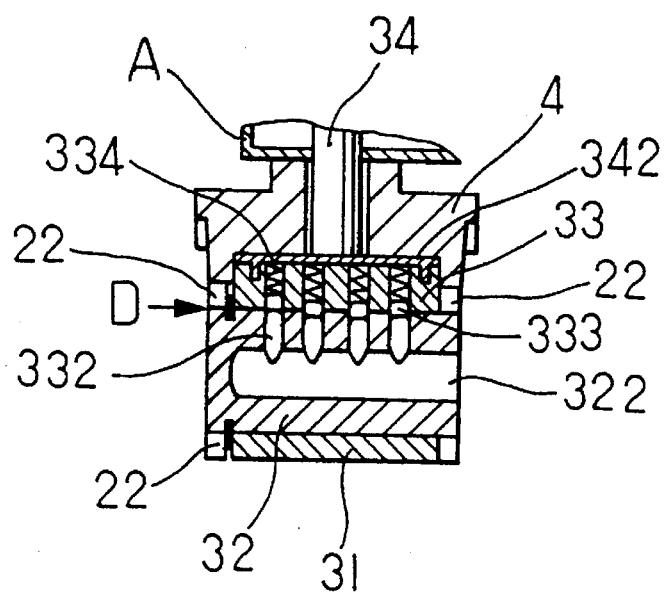
Figure 8:
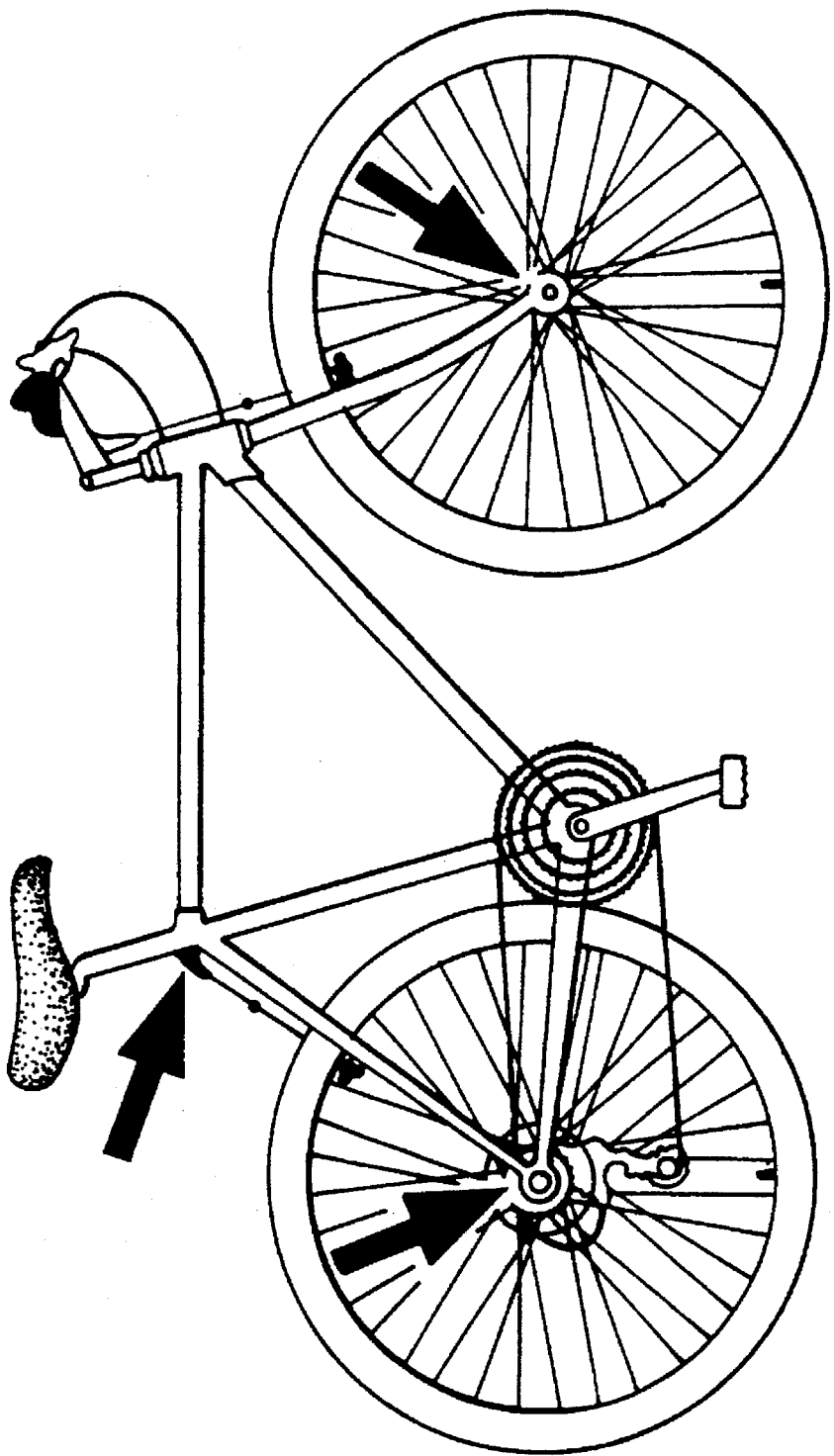
FIG. 8 is a side view of a bicycle illustrating the applications of the typical quick release mechanism.
Figure 9:
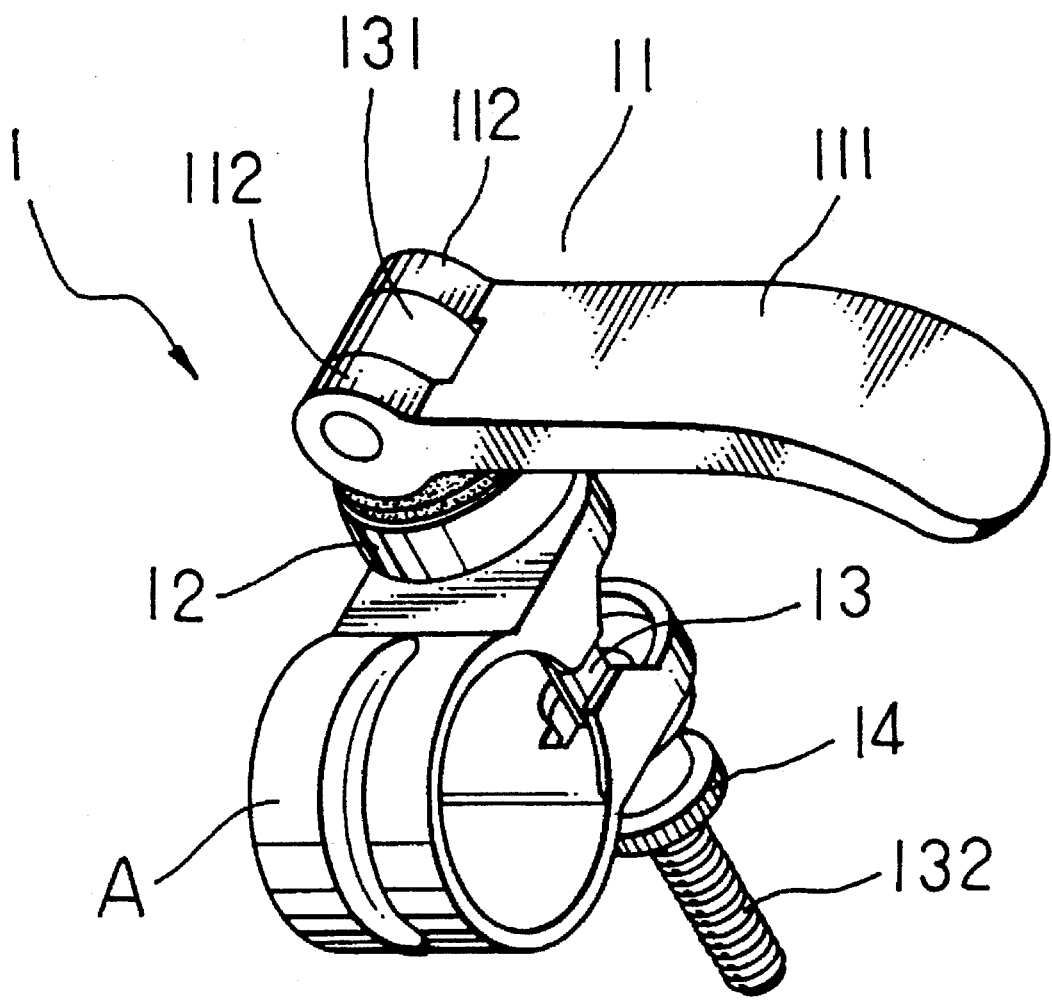
FIG. 9 is a perspective view of a typical quick release mechanism.

As shown in FIG. 7, the stubs 333 are biased to be engaged between the core 32 and the lock housing 31; i.e., the stubs 333 are engaged or intersected with the contact line D of the lock housing 31 and the core 32 such that the core 32 and the handle 2 are prevented from rotating relative to the lock housing 31. However, as shown in FIG. 6, when the key 37 is engaged in the key hole 322 and when the depressions 371 of the key 37 are engaged with the stubs 332, the stubs 333 can be moved inwards of the apertures 331 of the block 33 and the other stubs 332 are engaged in the holes 323 of the core 32, such that the stubs 332, 333 are aligned with the contact line D of the lock housing 31 and the core 32. At this moment, the core 32 and the handle 2 may rotate relative to the lock housing 31. When the key 37 is pulled out from the core 32, the handle 2 may be locked again when the stubs 333 are aligned with and engaged in the holes 323 of the core 32 again. The quick release mechanism can thus be locked and can not be disengaged from the bicycle frame.

Accordingly, the quick release mechanism includes a lock for locking the quick release mechanism.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A quick release mechanism comprising a post including a first end having an outer thread formed thereon and a second end having a lock housing provided thereon, a pad slidably engaged on said post, a nut threadedly engaged with said outer thread of said post, a core rotatably engaged in said lock housing and including two sides each having a rib formed thereon, a handle including two cams formed thereon, each of said cams including a groove formed therein for engaging with said ribs of said core such that said core and said handle rotate in concert, and means for locking said core to said lock housing so as to prevent said handle from rotating relative to said lock housing.

\* \* \* \* \*